CATHODE RAY TUBE APPARATUS

Filed Aug. 31, 1956 2 Sheets-Sheet 1

INVENTOR.
Gerald L. Caprio,
BY Mueller & Aichele
Atty's.

March 31, 1959 G. L. CAPRIO 2,880,367

CATHODE RAY TUBE APPARATUS

Filed Aug. 31, 1956 2 Sheets-Sheet 2

INVENTOR.
Gerald L. Caprio
BY Mueller & Aichele
Atty's.

United States Patent Office 2,880,367

Patented Mar. 31, 1959

2,880,367

CATHODE RAY TUBE APPARATUS

Gerald L. Caprio, Dundee, Ill., assignor to Motorola, Inc., Chicago, Ill., a corporation of Illinois Application August 31, 1956, Serial No. 607,498

2 Claims. (Cl. 315—27)

This invention relates to color television receivers and more particularly to deflection yokes for tri-beam cathode ray tubes used in such receivers.

One form of present day color television receiver uses a tri-beam cathode ray tube wherein the beams are produced by equilaterally spaced sources in the tube neck and are then scanned across a screen having a set of phosphor dots associated with each beam to produce separate colored rasters which form a composite raster appearing as one. The relative strength of the beams as scanned, of course, can then form an image the parts of which are in different colors. Commonly, as the tube is oriented the sources producing the beams which form the red and green rasters (called the red and green guns) are horizontally positioned in the same plane and the so-called blue gun is equally spaced from the other two and generally above them. These beams must converge at the viewing screen in all the scanned positions so that the rasters produced appear superimposed. It can easily be appreciated that a deflection or scanning field for the beams must have a particular form in order to deflect the spaced beams in the desired manner.

Proper deflection of a plurality of beams may be difficult to obtain because, among other reasons, the locus of convergence of the deflected beams may not coincide with the screen shape and the beams may impinge the screen with varied spacing therebetween at different points so that correct registry is not obtained. This is termed misconvergence. It should be pointed out that if the blue beam impingement point is equally spaced from the red and green points, that is if the points form an isosceles triangle, suitable dynamic convergence correction such as known in the art, may then be utilized to overcome this form of non-registry in a satisfactory manner. However, in order to obtain beam relationships which can be corrected by dynamic convergence, some correction of the field provided by the deflection yoke is necessary to compensate for the tube geometry which produces the above described misconvergence.

Such a defect can be corrected by increasing the yoke field flux density by a certain amount at the outer portions thereof, which, analysis will show, can correct the defect. However, with the tri-beam cathode ray tubes and deflection yokes constructed according to present day production methods, the exact deflection yoke field for optimum results still may not be formed in all cases. For example, due to variation of the yoke field distribution from design center, a defect known as keystoning may exist. This commonly takes the form of the red raster being of somewhat greater vertical dimension than the green raster on one side of the screen and the green raster being of somewhat greater vertical dimension than the red on the other side of the screen.

Accordingly, it is an object of this invention to provide apparatus which controls the field distribution of the deflection yoke so as to permit an optimum match of the particular cathode ray tube and associated deflection yoke to correct for keystoning.

Another object is to provide apparatus for controlling the keystone or skewed condition of the horizontal red and green traces formed in a tri-beam cathode ray tube at the corners of the screen, which apparatus may be quickly and conveniently adjusted under production or servicing conditions.

Still another object of the invention is to provide a deflection yoke for a tri-beam cathode ray tube which includes an adjustment primarily for controlling skewness of the red and green trace at the top and bottom of the screen and a further adjustment permitting slight change of the vertical and horizontal deflection fields with respect to one another for effectively tilting the blue raster.

A feature of the invention is the provision of an improved deflection yoke for a cathode ray tube including a pair of field influencing members mounted between the neck of the tube and the yoke and spaced on opposite sides of the neck. These members are individually slidable into the yoke field by manually operable controls for simplified alteration of the distribution thereof.

A further feature is the provision of a deflection yoke for a tri-beam cathode ray tube which is constructed so as to produce divergent traces of the red and green beams at the top and bottom of the tube screen and which includes a pair of field shaping members disposed between the yoke and tube neck and slidably adjustable parallel to the neck by means of rotatable rods for selectively shaping the deflection field and bringing the traces into superposition in a desired manner.

Another feature of the invention is the provision of a deflection yoke for a tri-beam cathode ray tube including a back cover for the yoke adapted to be fastened in different rotatable positions thereon. The cover supports the positioning rods secured to the field influencing members which are movable into the yoke field by adjustment of the rods. A rotatable sleeve is also disposed between the yoke and tube neck and includes cavities to support and guide the field influencing members, so that the field influencing members can be set in a particular angular position on the tube neck as well as in particular axial positions therealong for both tilting and varying the distribution of the yoke field.

Further object features and the attending advantages of the invention will be apparent upon consideration of the following description when taken in conjunction with the accompanying drawings in which.

Figures 1, 2, 3, 4, 7:
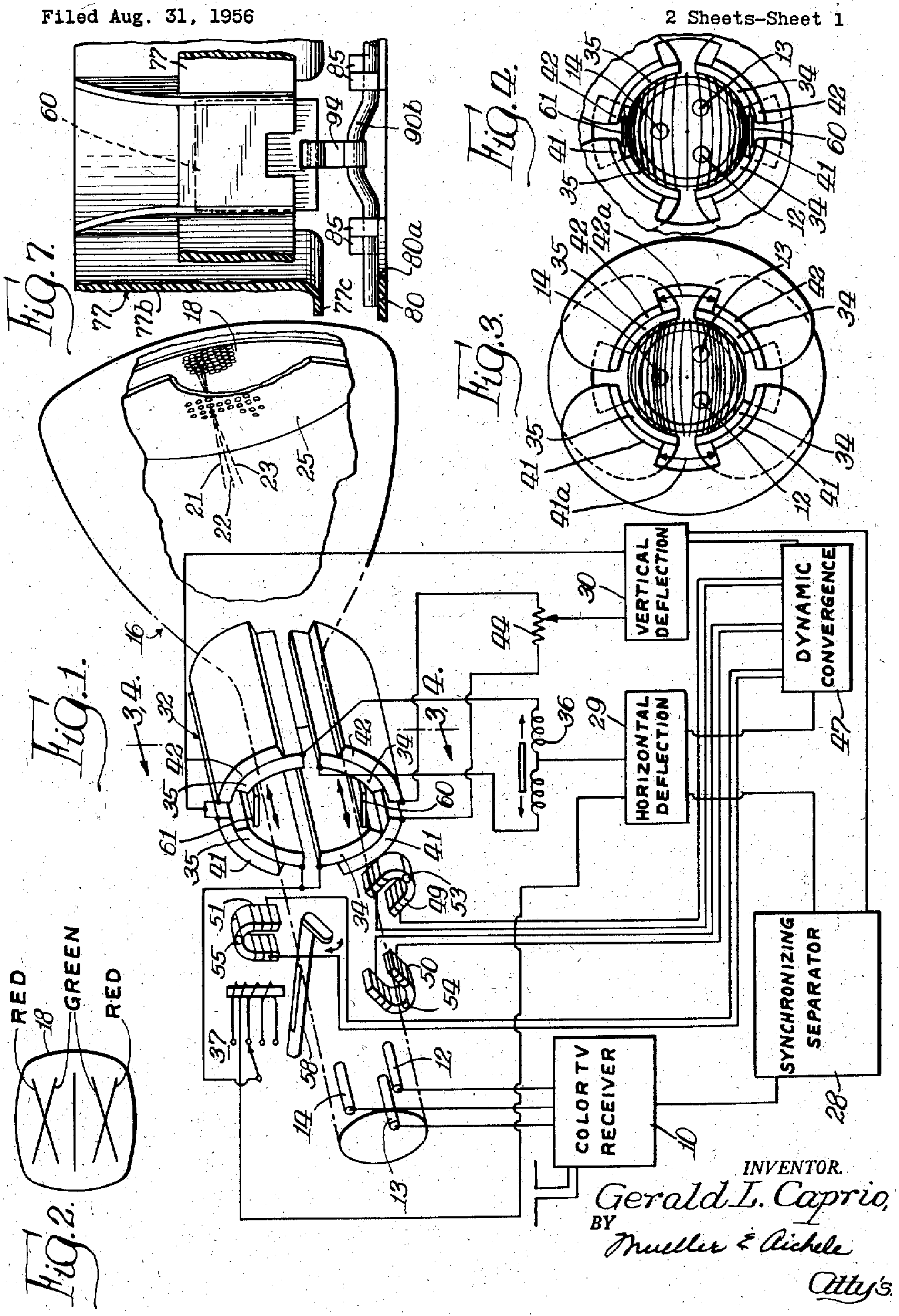
Fig. 1 is a diagram of the television receiver incorporating the invention.
Fig. 2 is a representation of beam traces on a cathode ray tube screen.
Figures 5, 6:
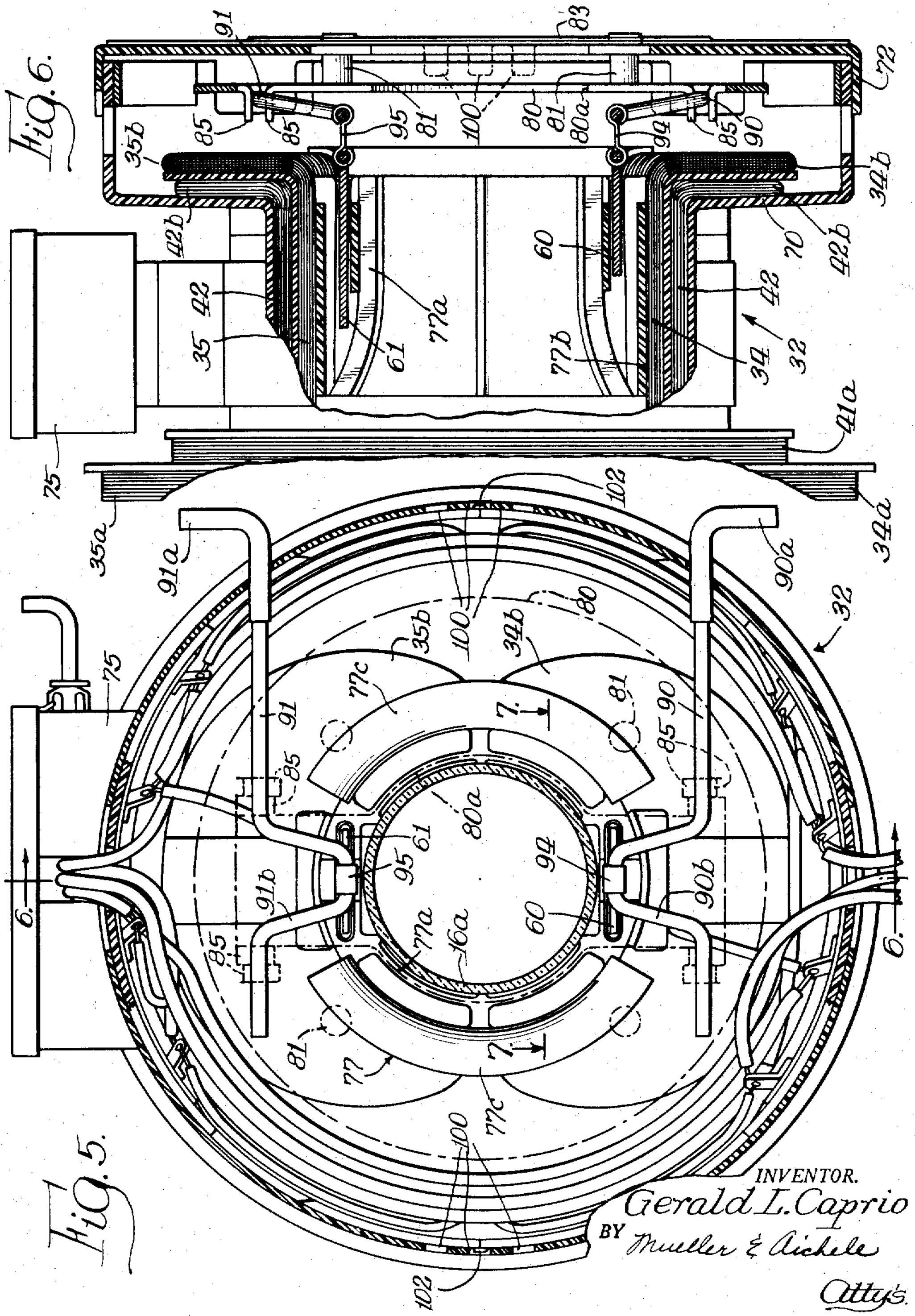

Figs. 3 and 4 are sectional views along the line 3—3 and 4—4 of Fig. 1, but with the addition of flares on the yoke windings;

Fig. 5 is a rear elevational view of a beam deflection yoke constructed in accordance with the invention;

Fig. 6 is a sectional view along the line 6—6 of Fig. 5; and

Fig. 7 is a sectional view along the line 7—7 of Fig. 5.

In the preferred form of the invention a deflection yoke for a tri-beam cathode ray tube is constructed so as to produce keystoning or divergence of the red and green traces, with the red and green traces skewed one way at the top of the screen and the opposite way at the bottom of the screen. This may be done, for example, by opening the "windows" of the vertical deflection coils to form a deflection field which is overly strong at the top and bottom of the tube neck and of barrel shape. This field is then corrected to the optimum for the particular tube and yoke combination by means of high permeability members which are movable by a variable amount into the upper and lower portions of this field. A sleeve insert is positioned between the yoke and the cathode ray tube neck for centering of the yoke and this sleeve includes slots in which the members are slidably disposed substantially parallel to the axis of the tube neck in the region where the vertical deflection coils come into close proximity so as to compensate for a certain amount of the barrel shape of the yoke field and reduce the field density in the upper and lower portion. This corrects the skewness of the red and green traces in the corners of the raster. In order to afford further correction in the form of some tilting of the beam traces, particularly the blue traces, the sleeve insert, the magnetic members, and associated adjustable mechanism for these members, is made rotatable with respect to the tube neck. This permits the desired tilting action by slightly affecting the orientation of the horizontal yoke field with respect to the vertical yoke field.

Fig. 1 shows a color television receiver 10 coupled to beam sources or electron guns 12, 13 and 14 in tri-beam cathode ray tube 16. The receiver 10 controls the beams in accordance with a received signal so that the relative excitation thereof produces a composite image on the screen 18. The beams, shown as travelling along beam paths 21, 22 and 23, are made to converge in an aperture of shadow mask 25 so that by approaching the mask at the proper angle each beam will strike only its intended phosphor dot. In the illustrated device, guns 12, 13 and 14 are associated respectively with red, green and blue. Each triad of dots on screen 18 comprises an element of a picture the composite of which forms the complete scene. The screen 18 may also be considered as providing separate red, green and blue rasters when the separate phosphor dots emitting light of those colors are impinged. As shown, the red and green guns 12 and 13 are disposed symmetrically with respect to a vertical axis of the tube or parallel to a horizontal plane through the tube axis and the blue gun 14 is above the other two and on the vertical axis of the tube. The guns are equilaterally spaced around the longitudinal axis through the neck section of the tube 16. It may be appreciated that the apparatus as shown is greatly out of proportion for the purpose of explanation.

The receiver 10 is also coupled to the synchronizing signal separator 28 which synchronizes the horizontal deflection system 29 and the vertical deflection system 30. A deflection yoke 32, shown without its end flares, is composed of a pair of horizontal deflection coils 34, 35 which are disposed on the bottom and top of the tube neck respectively and produce a field for simultaneously scanning the beams in a horizontal direction. Coils 34 and 35 are parallel connected through variable inductor 36 and a tap point of this inductor is coupled to the horizontal deflection system 29. The common connection of coils 34, 35 is connected through the blue raster size control coil 37, which is returned to the horizontal deflection circuit to be energized by signals of sawtooth form at 15.75 kilocycles. The vertical deflection coils 41, 42 are disposed on opposite sides of the tube neck and these provide a field for simultaneous vertical scanning of the beams. These coils are parallel connected through resistor 44 and the common connection of the coils together with the variable arm movable across resistor 44 are connected to the vertical deflection system 30. System 30 provides signals of sawtooth form at 60 cycles per second.

As explained and claimed in copending application of Richard G. O'Fallon, entitled Color Television Receiver, filed May 3, 1955, and bearing Serial No. 505,619, now Patent No. 2,825,846, inductor 36 and resistor 44 provide balancing of the horizontal and vertical deflection fields, respectively. With such controls it is possible to adjust the relative current in the coils and correct for certain types of misregistry of the three electron beams. Adjustment of inductor 36 will correct for skewness of the red and green beam traces at substantially all parts of the screen and particularly at the center thereof. Resistor 44 permits adjustment of the red and green vertical raster sizes so that these may be made to coincide.

The horizontal and vertical deflection systems 29 and 30 are also coupled to the dynamic convergence system 47 which develops signals of substantially parabolic wave form at both the line and field frequencies. These signals are applied to dynamic convergence coils 49, 50 and 51, which are disposed in proximity to the paths of beams from guns 12, 13 and 14, respectively. The cores for coils 49—51 are each split and permanent magnets 53, 54 and 55, magnetized across their respective diameters, are inserted between the cores of each coil. Adjustment of these magnets will shift the beam path slightly and in a radial direction to effect static convergence thereof at the center of the screen. A blue beam positioning magnet 58 is also provided, adjacent to the path of the blue beam for static convergence purposes. This magnet is a permanent magnet magnetized across its diameter and may be rotated to shift the blue beam horizontally since the magnet 55 would only cause vertical shift of the beam and this would not necessarily insure convergence of all three of the beams.

The blue raster size control coil 37 is supported in proximity to blue beam positioning magnet 58 in accordance with the system described and claimed in copending application of Merlyn M. Armstrong, and Richard G. O'Fallon entitled Color Television Receiver, filed August 21, 1956, and bearing Serial No. 605,302. In brief, this device is a variable inductor the field from which may be combined with the field from the blue beam positioning magnet 58 in either additive or subtractive relation. A sawtooth current of line deflection frequency is passed through this coil and accordingly, the size of the blue raster may be varied dynamically and by a selected amount according to the adjustment of the inductor. This has been found desirable with some tube and yoke combinations since a deflection field which is optimized for red and green convergence may not be of the best form for the proper registry of the blue beam. Thus a separate control is provided for the adjustment of the blue raster size.

As previously pointed out, and even though there is proper adjustment of the horizontal yoke balancing inductor 36 to correct for skewness of the red and green traces at the center of the screen, there still may be a skewness condition of these traces at the top and/or bottom of the screen as shown in Fig. 2. Here it may be noted that the horizontal red traces are more closely spaced at the left of the screen 18 than they are at the right. Conversely the horizontal green traces are spaced by a greater amount at the left than at the right. This is known in the art as keystoning. A center trace is shown in proper registry and it is contemplated that the illustrated traces are of the type which would be produced by a suitable pattern generator coupled to the receiver for the purpose of alignment. This keystoning could take the form illustrated or could be of the reversed type in which case the position of the traces would be interchanged. To eliminate such divergence of the traces and the lack of registration of the respective rasters caused thereby, keystone correctors 60 and 61 are used. In Fig. 1 these are illustrated in a position between the tube neck and the line where the vertical deflection coils are in close proximity to one another, which is essentially adjacent the windows of the horizontal deflection coils. The correctors 60, 61 are made adjustable on respective lines substantially parallel to the axis of the tube neck so that they may be moved by a selected amount into the yoke field. Provision may also be made for slightly rotating these correctors about the tube neck for tilting the horizontal and vertical yoke fields with respect to one another to correct any slight defect caused by improper orientation of these fields.

The preferred manner of utilizing the correctors 60, 61 is to construct the deflection yoke 32 so that its field is slightly more barrel in shape than would be desirable for the usual attempt to obtain registry of the traces. Fig. 3 shows yoke 32 (with end flares) and the flux condition which may be effected by opening the windows 41a and 42a of vertical deflection coils 41, 42 thus increasing the spacing of the turns within each coil along the sides of the tube neck to reduce the field density at its center and render the top and bottom portions of the field somewhat stronger than desired for optimum performance. This will, of course, produce a certain type of keystoning or skewness condition of the red and green traces, for example, with the red raster small on the left and large on the right and the opposite situation for the green raster. As shown in Fig. 4 the field is modified as the keystoning is corrected by a field reinforcement method wherein the correctors 60, 61 are positioned in proximity to the line where the coils 41 and 42 approach one another at the top and bottom of the neck. The correctors 60, 61 are formed of a material having high permeability so as to offer low reluctance to the yoke flux and correct its barrel shape with a less dense field at the top and bottom in the region of the guns. The correctors are introduced by a greater or lesser extent into the yoke field so as to control the amount of influence they have. Accordingly, by their adjustment correction may be made so that the beam traces are superimposed and any mismatch of the yoke and tube combination or variation of the yoke design center from optimum, may be simply compensated by adjusting correctors 60, 61.

Figures 5, 6 and 7 show the mechanical construction of the deflection yoke 32. This device includes a housing 70 and a back cover 72. Within this housing the saddle-shaped horizontal and vertical deflection coils 34, 35, 41 and 42 are disposed with the conductors extending parallel to the axis of the central opening. These coils include respective front and back flares referenced by the addition of *a* and *b*, respectively. A box 75 is disposed on top of the unit and this contains the balancing inductor 36 and the balancing resistor 44.

For centering of the yoke on the tube neck 16a and to provide a guide for the correctors 60, 61, a sleeve 77 is used. This sleeve includes an inner cylinder 77a which fits the tube neck and an outer cylinder 77b spaced from the inner cylinder by various struts joining the cylinders. The sleeve further includes a pair of rear flanges 77c which fit against the rear flares 34b and 35b of the horizontal deflection coils.

A cover plate 80 is secured to the inside of back cover 72 by means of spacers 81 and the same spacers retain an annular magnetic shield 83 to the rear of the back cover. Plate 80 includes an opening 80a through which the tube neck 16a extends. This plate also has inwardly extending lugs 85 which are spaced at the top and the bottom of the plate and between which rods 90 and 91 are captured. (Fig. 7). These rods extend outwardly from the back cover 72 and have bent portions 90a and 91a providing handles for manual rotation thereof. The rods further include offset portions 90b and 91b forming respective cranks which are coupled to slots within the correctors 60, 61 by means of rings 94, 95, respectively. Opening 80a is enlarged at the top and the bottom so as to clear the crank portions 90b and 91b and permit full rotation thereof. As may be seen in Fig. 6 it is preferable to make the upper corrector 61 of somewhat greater length than the lower corrector 60 since this corrector will be further removed from the two red and green beam sources 12 and 13 and a greater alteration of the magnetic field may be required in the upper portion of the field.

The desired parts of the yoke as described may be constructed of material which is non-magnetic with the exception of the correctors 60, 61. These are preferably formed of high permeability material in order to reinforce the magnetic field at the upper and lower portions as previously described. In this form the preferred material for the correctors is ferrite powder coated high permeability steel. However, it is also recognized that the correction to the field may be effected by the use of a material of high conductivity in which case the correction is made by introducing eddy currents within the correctors so as to oppose a portion of the yoke flux. In this case, of course, the yoke will most conveniently be constructed with a certain amount of pincushion distortion in its field which would be corrected by use of the members. However, in this form, the correctors would introduce considerable loss and the efficiency of the yoke would be undesirably reduced.

The back cover 72 further includes apertures 100 along each side and opposite ones of these apertures lock over projections 102 of the yoke housing 70. By having several pairs of apertures along opposite sides of the back cover, it is possible to rotate this cover with respect to the housing thus rotating the entire apparatus including plate 80, rotatable rods 90, 91 and correctors 60, 61. Sleeve 77 may also be rotated since it is supported within the yoke merely by the friction of a snug fit. By thus rotating the corrector mechanism the correctors 60, 61 would be positioned a few degrees from a vertical axis of the tube. This has the effect of slightly tilting the horizontal field with respect to the vertical field. This correction will compensate for any slight error in the yoke windings if the produced fields are not exactly perpendicular to one another.

In order to best obtain the benefits of the invention and to obtain optimum registry of the red, blue and green rasters in television receivers of practical construction the following order of adjusting the circuit elements shown in Fig. 1 is preferred, all of which is done with a suitable signal generator coupled to the receiver. The first adjustment is made by rotating permanent magnets 53, 54, 55 and 58 to statically converge the beams at the center of the screen. Following this, the yoke balancers, namely, inductor 36 and resistor 44 are adjusted for skewness or divergence of the red and green horizontal traces and for registry of the vertical red and green rasters. The next alignment step is positioning of the keystone correctors 60, 61 by means of rotating handles 90a and 91a. Proper positioning of corrector 60 will bring the red and green traces at the bottom of screen 18 as seen in Fig. 2 into registry. Similarly, corrector 61 can correct the traces at the top of the screen. In given situations it may be found that unequal amounts of the correctors are introduced into the yoke field in which case there may be an unbalance of the field which can be corrected through further adjustment of the yoke balancers. However, assuming proper superposition of the red and green rasters the blue raster size control 37 may then be adjusted for proper width of this raster. It may also be advisable to slightly rotate the keystone correctors as previously described in order to tilt the blue raster. At this point the dynamic convergence system 47 may be used for proper convergence of the beams in all deflected positions. It may be appreciated that the convergence system will be simpler to adjust and improved convergence will result if the static adjustments of the beams have been made as previously described.

Accordingly, this invention provides simple apparatus for optimum match of a particular cathode ray tube and associated deflection yoke to correct keystoning of beam traces. The device is conveniently adjustable by rotation of a pair of rotatable rods which simplifies original receiver production as well as subsequent servicing in the field. The yoke apparatus in accordance with the invention also permits slight rotation of at least one of the yoke fields to correct for any slight lack of proper orientation thereof. Thus, it is possible to match tubes and yokes having comparatively wide manufacturing tolerances in order to produce improved monochrome rendition in a color television receiver.

I claim:

1. In a color television receiver including a cathode ray tube having a neck section, a screen, and first, second and third electron beam sources equilaterally disposed centrally of the neck section with the first and second sources in substantially coplanar relation, a deflection yoke adapted to be disposed on the neck section and having windings constructed to provide a deflection field thereacross of barrel shape for simultaneously scanning the beams so that beams from the first and second sources produce traces in the corners of the screen skewed with respect to the plane of the first and second sources, a sleeve adapted to be positioned between said yoke and the neck section, said sleeve having a pair of slots therein along opposite sides thereof and oriented substantially parallel to the plane of said first and second sources, said sleeve being rotatable with respect to the neck section, a high permeability field modifying member positioned in each of said slots, support means carried by said yoke on the side thereof facing said beam sources, said support means being rotatable with respect to said yoke and being adapted to be fixed in positions tilted with respect to the plane of the first and second sources so that rotation of said sleeve and said support means with each field modifying member causes selective modification of the deflection field, and a pair of manually rotatable rods carried by said support means, said rotatable rods having offset portions coupled to said field modifying members for individually positioning the same by a given amount within the deflection field upon rotation of said rods for modifying the deflection field of barrel shape to reduce the skewness of said traces.

2. In a color television receiver including a cathode ray tube having a neck section, a screen, and first, second, and third electron beam sources equilaterally disposed centrally of the neck section with the first and second sources in substantially coplanar relation, the combination of a deflection yoke adapted to be disposed on the neck section and having respective pairs of line and field deflection windings constructed to provide a deflection field thereacross for simultaneously scanning the beams from the beam sources with the beams from the first and second sources producing traces in the corners of the screen which are skewed with respect to the plane of the first and second sources, a pair of high permeability field modifying members, means for supporting said field modifying members positioned within the deflection field along opposite sides of the neck section and substantially parallel to the plane of the first and second sources, adjustable means for individually varying the introduction of said field modifying members into the deflection field along the neck section of the cathode ray tube for correcting the distribution of said field and reducing the skewed condition of the traces of the beams from the first and second sources, means for energizing said pair of line deflection windings with scanning signals and including variable balancing means for regulating the energization of one of said pair of line deflection windings with respect to the other thereby correcting for the impedance change of such windings and modifying said field corrected by the individual position of said field modifying members.

References Cited in the file of this patent

UNITED STATES PATENTS

| | | |
|---|---|---|
| 2,562,395 | Schlesinger | July 31, 1951 |
| 2,568,456 | Malheiros | Sept. 18, 1951 |
| 2,569,343 | Scull | Sept. 25, 1951 |
| 2,704,816 | Fernsler | Mar. 22, 1955 |
| 2,825,846 | O'Fallon | Mar. 4, 1958 |